No. 641,992. Patented Jan. 23, 1900.
G. A. NUSSBAUM.
STEAM GENERATOR.
(Application filed Mar. 31, 1898.)

(No Model.) 4 Sheets—Sheet 1.

Witnesses.
W. Cross
H. Brmgham

Inventor.
G. A. Nussbaum

No. 641,992. Patented Jan. 23, 1900.
G. A. NUSSBAUM.
STEAM GENERATOR.
(Application filed Mar. 31, 1898.)
(No Model.) 4 Sheets—Sheet 2.
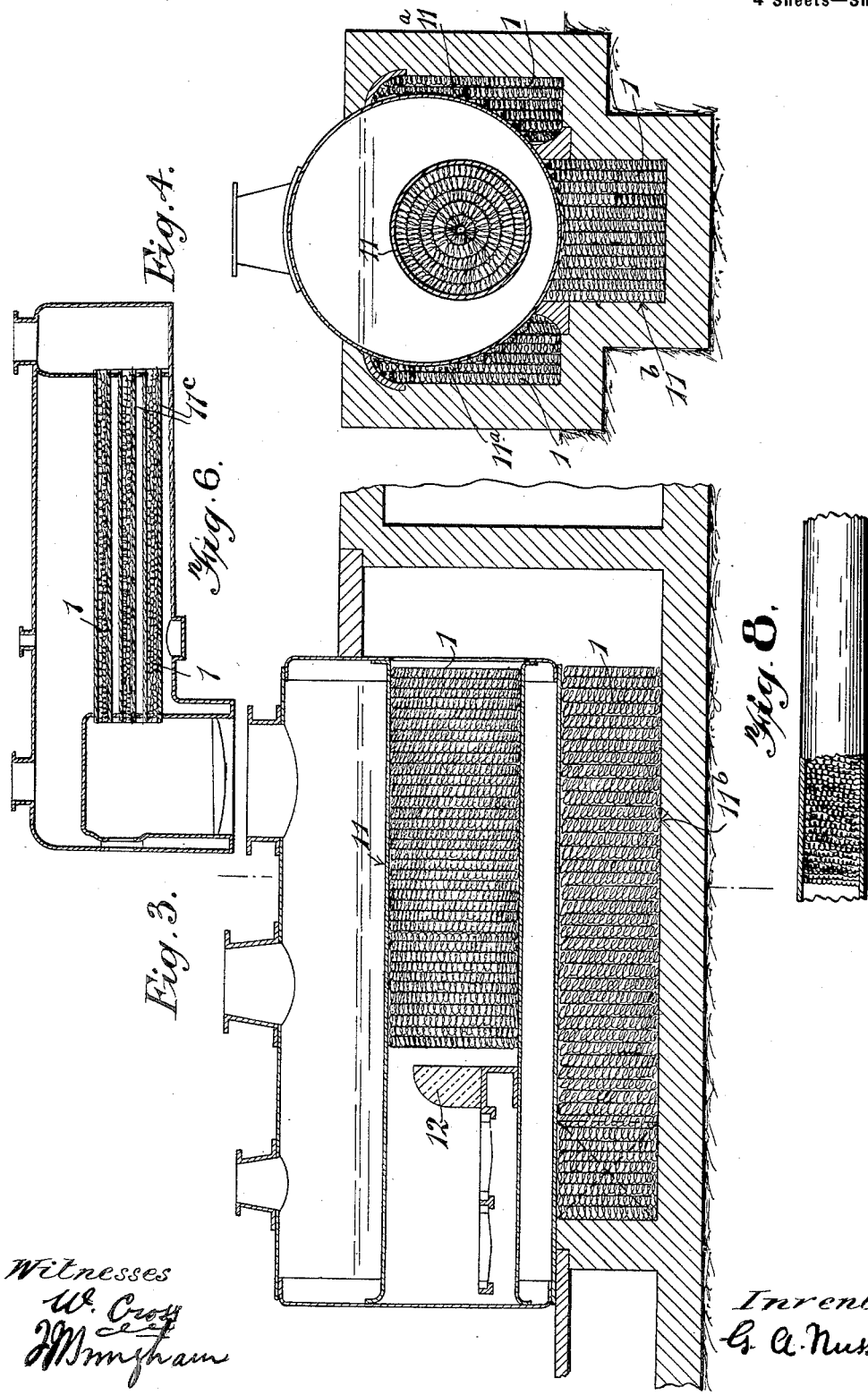
Witnesses
W. Cross
J. Mingham
Inventor:
G. A. Nussbaum

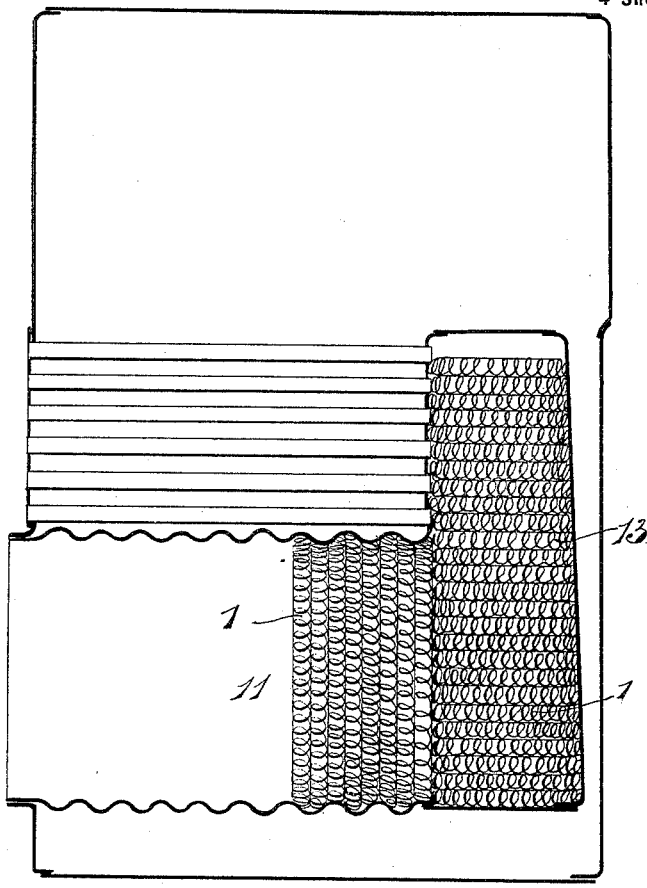

No. 641,992. Patented Jan. 23, 1900.
G. A. NUSSBAUM.
STEAM GENERATOR.
(Application filed Mar. 31, 1898.)
(No Model.) 4 Sheets—Sheet 4.
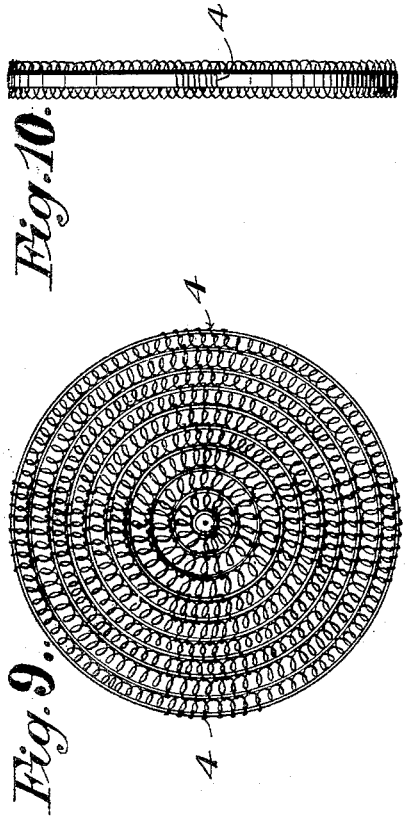
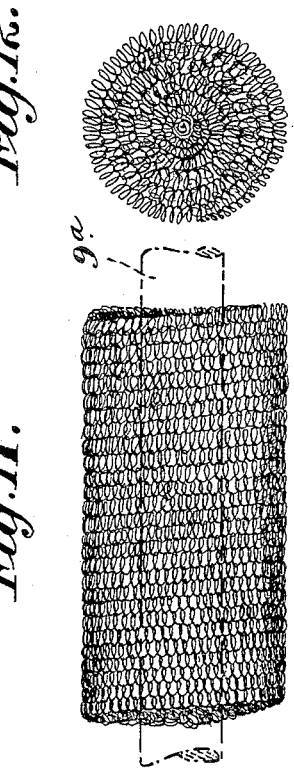
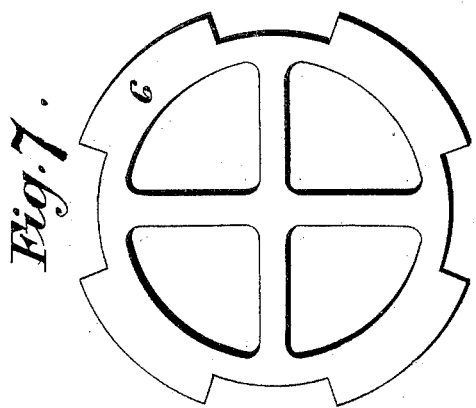
Witnesses
W. Cross
H. Bingham
Inventor.
G. A. Nussbaum

UNITED STATES PATENT OFFICE.

GUILLAUME ARNAUD NUSSBAUM, OF LONDON, ENGLAND.

STEAM-GENERATOR.

SPECIFICATION forming part of Letters Patent No. 641,992, dated January 23, 1900.

Application filed March 31, 1898. Serial No. 675,918. (No model.)

*To all whom it may concern:*

Be it known that I, GUILLAUME ARNAUD NUSSBAUM, a subject of the Queen of Great Britain and Ireland, residing at London, in the county of Middlesex, England, have invented improvements in or applicable to steam-generators and other apparatus for transferring heat from one medium to another by conduction, of which the following is a specification.

This invention has reference to improvements in or applicable to steam-boiler furnaces and the like; and it has for object to provide simple, cheap, and easily-applied means whereby hot gases and air flowing through the flues of furnaces and the like shall be intimately mixed together, so as to produce complete combustion of such gases and whereby the heat thereof shall be utilized in a more efficient manner than usual. For this purpose I provide within the furnace-flue an open-work metallic device composed of metal—for example, wire in a coiled, twisted, crumpled, matted, or netted condition or strip metal—which is so disposed in the flue as to fill the whole cross-section thereof and present to hot gases brought in contact therewith a large conducting-surface that will effectually break up the stream of hot gases and air in the path of which the said device is placed and intimately mix such gases and air, so as to effect practically complete combustion thereof and bring them into effective contact with the wall of the flue without offering undue resistance to the flow of the gases, and which device will itself absorb heat from the said hot gases and act as a heat-accumulator from which heat will be transmitted by radiation and by conduction to the wall of the flue, and thus to the fluid in contact with the opposite side of the wall. Such an open-work metallic device, which is hereinafter called for distinction a "mixing and heating device," can be made in a variety of forms and be applied to boiler-furnaces and the like in various ways, as I shall now describe with reference to the accompanying illustrative drawings, wherein—

Figure 1 shows in central section an ordinary steam-generator of vertical type provided with a mixing and heating device according to this invention. Fig. 2 is a similar view to Fig. 1, but showing the said device provided with a core of refractory non-conducting material. Fig. 3 shows in longitudinal section, and Fig. 4 in cross-section, a steam-generator of the Cornish type provided with my mixing and heating device. Fig. 5 shows in central longitudinal section the application of such a device to a steam-generator of marine type. Fig. 6 is a longitudinal section of a locomotive type of boiler having my invention applied thereto. Fig. 7 is a plan view showing a support for a device of the kind referred to. Fig. 8 shows a piece of a stovepipe provided with a heating and mixing device. Figs. 9 and 10 are elevations at right angles to one another, showing one element or part of the heat-accumulators shown in Figs. 1 to 5, inclusive. Fig. 11 is an elevation, and Fig. 11 a cross-section, showing an element of modified shape and such as may be used in a pipe as shown in Fig. 8.

In the arrangement shown in Fig. 1 the mixing and heating device is built up of a number of separate wirework sections 1, that are suitably supported in a horizontal position, one above the other, within the upper part of the combustion chamber or flue of the steam-boiler, so as to extend across the same in a direction at right angles to and be in the path of the flame and stream of hot gases passing to the chimney. The wire of which the sections 1 are made may be of any suitable metal—for example, iron—and of any suitable section and gage.

Figs. 9 and 10 show a form in which the wirework sections may be made. In this case the section comprises a number of concentric rings of spirally-wound metal wire separated by rings 1ᵃ of thin strip metal, the whole being connected together by ligatures 4 of metal wire.

In Fig. 1 the several sections 1 of which the heat-accumulator is composed are carried by a supporting-piece 6, such as shown in Fig. 7, that is adapted to be passed upward to a position above and then by rotation caused to rest upon brackets 6ᵃ, secured to the inner side of the combustion-chamber. In Fig. 1 7 is a vertically-adjustable baffle-plate arranged below the bottom of the chimney 8 with a view of regulating the draft and of causing flame and hot gases coming from the furnace below to be dispersed laterally throughout the heat-accumulator 1 instead of passing up direct through the center thereof to the chimney.

In Fig. 2 a core 9, of refractory non-conducting material, such as fire-clay, is suspended in the center of the mixing and heating device by the rod 10. The sections 1 of which the said device is made are in this case made with a central opening of a size to fit the core, but in other respects may be of the kind hereinbefore described or of other suitable kind.

Instead of carrying the support 6 by brackets 6ª, as in Figs. 1 and 2, it may be carried by the rod 10, which is adapted at the bottom to be connected to the support and is connected at the top to a lever, by operating which the said sections can be shaken when it is desired to clear them of any matter that may be adhering to them.

In Figs. 3 and 4 wirework sections 1 of the kind hereinbefore referred to and constituting the mixing and heating device are shown arranged vertically in the furnace-flue 11, behind the fire-bridge 12. Similar devices may also, if desired and as shown, be arranged in the side portions 11ª and bottom portion 11ᵇ of the furnace-flue external to the steam-generator, the sections comprising such devices being suitably shaped to fit such portions of flue.

Fig. 5 shows a mixing and heating device of the kind described arranged in the flue 11 and combustion-chamber 13 of a marine steam-generator.

Fig. 6 shows a locomotive type of boiler having mixing and heating devices removably arranged in the fire-tubes 11ᶜ. In this case the size of the fire-tubes may be larger than usual.

Figure 1:
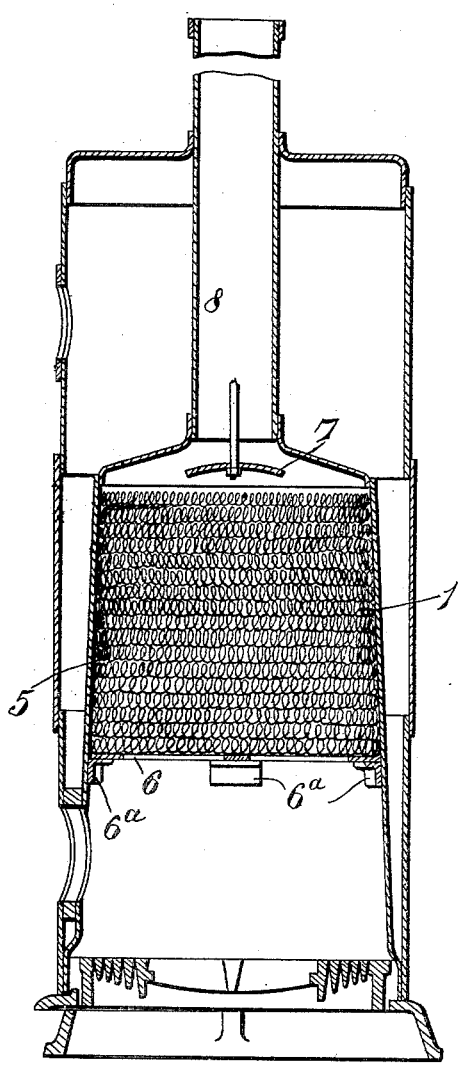
Figure 2:
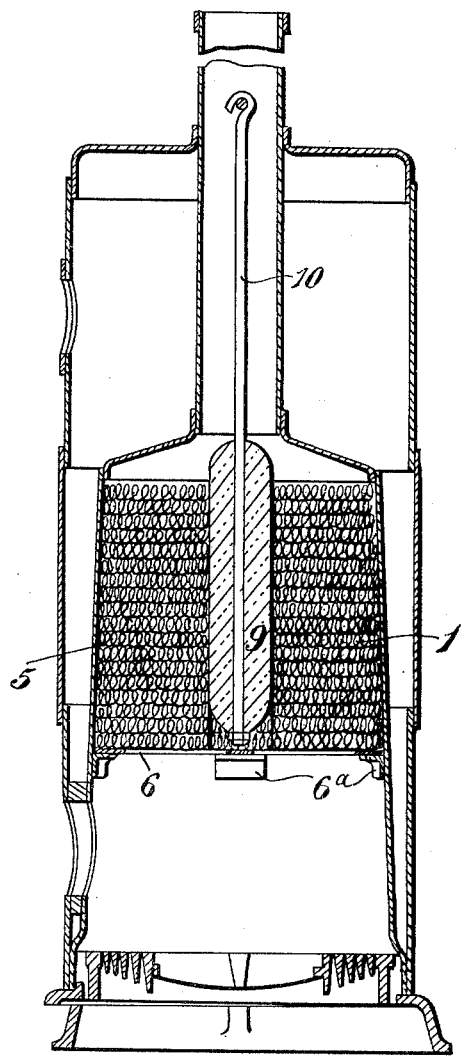

Fig. 8 shows the mixing and heating device used in a stovepipe, through which hot gases pass for increasing the heat-radiating power of the pipe. The mixing and heating device may in this and other cases be made of the shape shown in Figs. 11 and 12 and consist of a length of spirally-wound wire wrapped spirally on itself, the convolutions being connected together when and where necessary. Such a mixing and heating device may have a core 9ª (indicated in dotted lines) of asbestos or like refractory non-conducting material.

In each case the mixing and heating device is arranged in close contact with the wall of the flue in which it is placed, so that heat can be readily transferred from it to the wall or heating-surface by conduction as well as by radiation, so that excessive or undue heating of the device will be prevented. The lateral expansion of the said device when heated will also aid in insuring an effective contact between the said device and flue-wall when in use.

As will be seen, the mixing and heating device in each of the examples hereinbefore described is so constructed and arranged that it will effect an intimate mixture of the hot gases and air flowing through the flue in which it is placed, so that practically complete combustion of the hot gases will be produced and a very high temperature attained, whereby formation of soot and smoke will be prevented, or nearly so, and a greater fuel efficiency than usual obtained. The said device will also serve to deflect the hot gases against the wall of the flue, and while it will not offer an undue resistance to the flow of the hot gases toward the chimney or uptake it will serve to lessen or prevent downdraft, so that steam-boilers, specially those of portable engines, can be advantageously worked under atmospheric conditions that would seriously interfere with the working of steam-boilers the flues of which were unprovided with such mixing and heating devices. Furthermore, by the use of my mixing and heating devices highly efficient express steam-boilers can be constructed in a simpler and cheaper manner than usual. Also by reason of the great amount of heat stored in such devices an unfavorable cooling of the heating-surface of the boiler is prevented when the fire-door is opened and when cold water is fed into the boiler.

I am aware that furnace-flues have heretofore been provided with internal ribs or projections and with wire coils or spirals arranged only in close contact with the inner surface of the flue, so as to retard the passage of hot gases through the flue; also, that the fire-tubes of steam-generators have been provided with central screw-blades and with cores provided with screw-threads with the object of imparting a spiral motion to the streams of hot gases flowing through such tubes and so bringing them in contact with the inner surfaces of the tubes. Such arrangements, however, have not filled or extended directly across the flue, so as to break up the stream of hot gases at all parts of the cross-section thereof, and thus effect an intimate intermingling of all portions thereof in such a way as to insure practically complete combustion thereof and also to abstract heat from the central and intermediate portions of the stream of hot gases, as well as from the outer periphery thereof, and at the same time to serve as a heat-accumulator adapted to act both by radiation and conduction, as is the case with mixing and heating devices constructed and arranged in the manner I have hereinbefore explained.

What I claim is—

1. In a steam-generator, the combination with the furnace-flue or fire-tube through which hot gas and air flow and which is surrounded by water to be heated, of an openwork metallic mixing and heating device arranged lengthwise within said flue or tube and in contact with the inner surface thereof, said device being composed of metal such as wire in a coiled, twisted, crumpled, matted or netted condition adapted to fill or extend across the flue without offering undue resistance to the flow of hot gases and air therethrough and to intimately mix all parts of such hot gases and air together so as to effect efficient combustion thereof and to itself become heated and act as a heat-accumulator whereby heat will be transmitted in an efficient manner from all parts of the stream of hot gases to the wall of the flue, substantially as described and shown.

2. In a steam-generator, the combination with a furnace flue or tube surrounded by water of a mixing and heating device comprising an open-work metallic mass having a core of refractory material that is a bad conductor of heat, said device being arranged in said flue or tube so as to be in contact with the inner surface thereof and so as to break up the stream of hot gases and air flowing through said flue or tube, substantially as described for the purposes specified.

3. A heating and mixing device for flue-tubes and the like, comprising a number of open-work metal elements built up of lengths of spirally-coiled metal arranged side by side, substantially as described for the purpose specified.

4. A heating and mixing device for flue-tubes and the like comprising an open-work metallic mass built up of spirally-coiled metal wire and provided with a core of refractory non-conducting material, substantially as described for the purpose specified.

5. In a steam-generator, the combination with a metal furnace-flue or fire-tube surrounded by water, of a metallic mixing and heating device comprising a plurality of open-work diaphragms or divisions arranged in said flue or tube so as to be in contact with the wall thereof and in the path of hot gases and air passing to the chimney or uptake, said devices, diaphragms or divisions being composed of plate-like elements of coiled, twisted or crumpled lengths of metal wire or strip and arranged at right angles to the length of said flue or tube so as to break up and mix together said hot gases and air and deflect them against the heating-surface of said flue or tube, substantially as described.

Signed at 2 Pope's Head Alley, Cornhill, in the city of London, England, this 23d day of March, 1898.

GUILLAUME ARNAUD NUSSBAUM.

Witnesses:
EDMUND S. SNEWIN,
WM. O. BROWN.